United States Patent [19]
Garrett et al.

[11] 3,758,004
[45] Sept. 11, 1973

[54] DIAL-CONTROLLED DISPENSER FOR POWDERED OR PARTICULAR MATERIAL

[76] Inventors: Lawrence E. Garrett, Rt. 1, Box 676; Luther B. Garrett, 824 Miller Ave., both of Dallas, Oreg. 97328

[22] Filed: Feb. 28, 1972

[21] Appl. No.: 229,739

[52] U.S. Cl. .............................. 222/181, 222/368
[51] Int. Cl. ............................................ B65g 29/00
[58] Field of Search ................. 222/185, 368, 367, 222/180, 181, 427

[56] References Cited
UNITED STATES PATENTS

| | | | |
|---|---|---|---|
| 2,025,821 | 12/1935 | Nordmarken | 222/368 |
| 2,684,788 | 7/1954 | Bland | 222/368 X |
| 2,135,665 | 11/1938 | Hoban | 222/368 X |
| 2,975,527 | 3/1961 | Bushway | 222/368 X |

Primary Examiner—Robert B. Reeves
Assistant Examiner—James M. Slattery
Attorney—L. R. Geisler

[57] ABSTRACT

A wheel on a horizontal axis in a dispensing container has a continuous series of scoops in its periphery which produce the discharge of material from the dispenser. The wheel is rotated and controlled by an external finger-operated dial. Clogging of the wheel is prevented by a recess in each of the adjacent walls of the container facing the lower portion of the wheel and by decreasing thickness of the wheel at its center portion. Close tolerance of the peripheral walls and lips of the wheel with the discharging mouth of the dispenser enable desired amounts of material to be accurately dispersed. For powdered material an agitator in the container prevents caking.

3 Claims, 5 Drawing Figures

Patented Sept. 11, 1973
3,758,004
2 Sheets-Sheet 1
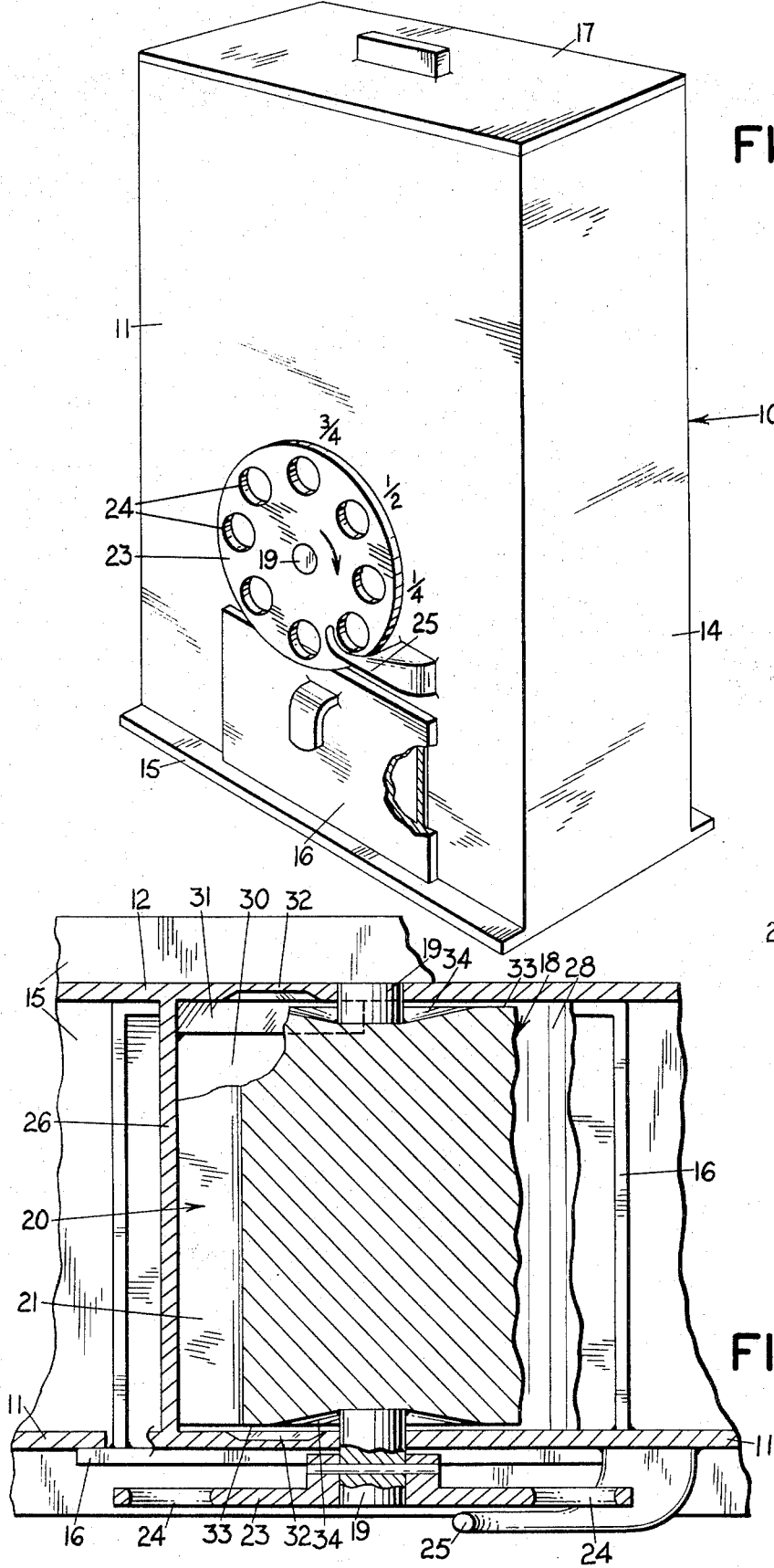
FIG. 1
FIG. 3
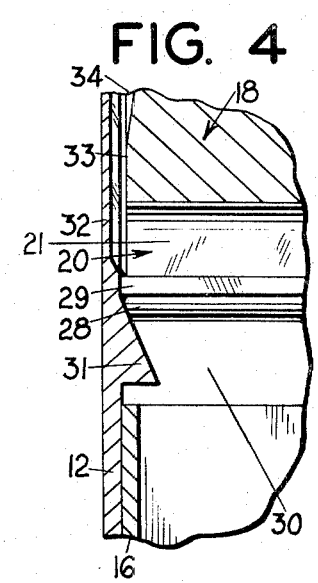
FIG. 4

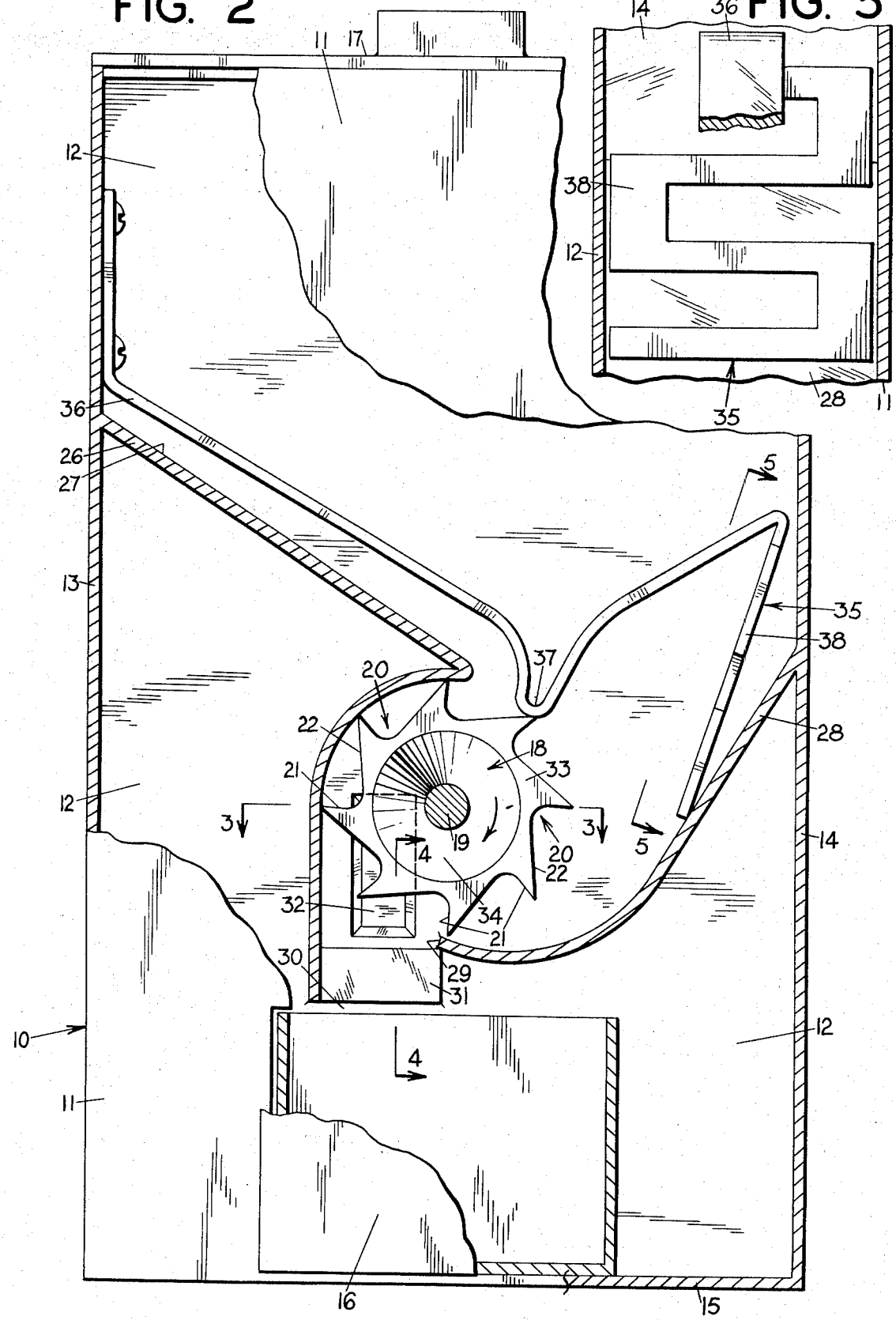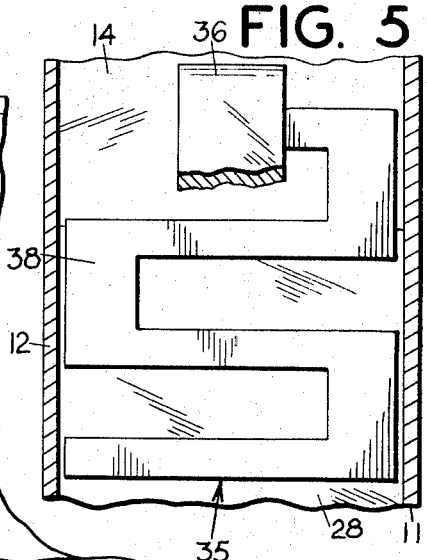

DIAL-CONTROLLED DISPENSER FOR POWDERED OR PARTICULAR MATERIAL

BACKGROUND OF THE INVENTION

The use of dial-operated dispensers for granular, particular or powdered material is known to be old in general. The object of the present invention is to provide an improved, simplified and practical dial-operated and dial-controlled device suitable for use in the kitchen for dispensing such materials as salt, sugar, coffee, etc., or flour, or for use in the laundry for dispensing granular or powdered soap material.

U.S. Pat. No. 2,808,181, issued Oct. 1, 1957, shows a device for dispensing small quantities of seeds intermittently by means of a wheel, rotated on a horizontal axis, which wheel has spaced pockets in its periphery to convey seeds from the top intake to a restricted outlet channel. The periphery of the wheel engages a flexible contact strip in the outlet channel. This device is designed for an entirely different use and could not be satisfactorily employed for more accurately dispensing powdered or small particled materials.

U.S. Pat. No. 2,750,072, issued June 12, 1956, describes a dispenser operated by means of a finger dial mounted at the top which rotates a vertical shaft connected to a bottom disc having radially-extending arms to push the material through an opening into a receiving receptacle. The complicated construction of his device would appear to be a main objectionable feature.

A dispenser in which the discharge of material is controlled by one or more drums, mounted on a horizontal axis, and rotated by an external finger-operated dial, is described in U.S. Pat. No. 3,261,503, issued July 19, 1966. Each of the discharging drums is formed with radially-extending projections providing pockets in between which carry the material to a discharging chute at the bottom. While the radially-extending projections of the drum or drums are in close contact with the walls of the container leading to the discharging chute, an objectionable feature is the probability of some of the material building up between the end faces of the drums and between the end faces of the drums and the adjacent walls of the container, which in time would render rotation of the drum or drums more difficult, unless the device was disassembled and cleaned with sufficient frequency. A feature of the present invention is the fact that special provision is made for constantly disposing of any individual particles which might find their way down in between a face of the rotated wheel and the adjacent face of the container, thus preventing any building up of material between the wheel and the adjacent walls and the clogging of the wheel.

SUMMARY OF THE INVENTION

The wheel, which is operated to dispense the material from the container, and which is rotated on a horizontal axis by an external finger dial control, has its periphery formed with a continuous series of identical scoops, each of the proper capacity to carry a minimum or incremental unit quantity to be dispersed. Each scoop comprises an inwardly-extending back wall curving at the bottom to a bottom wall which extends at greater length back to the wheel periphery and to the top of the back wall of the preceding scoop. Material is first encountered by the wheel when the periphery of the wheel has passed top center and each scoop as it moves downwardly carries its proper quantity of the material through a passageway of reduced depth, the bottom wall of which passageway curves upwardly as it approaches its termination so as to present only very slight tolerance for the back wall of the scoop which has reached its full discharging position in the discharge outlet for the container. The side walls of the wheel in the peripheral area of the scoops have only slight clearance with respective side walls of the container. The finger disc control is provided with finger apertures corresponding to the wheel scoops, and a suitable stop cooperates with the finger apertures so that whenever rotation of the wheel is stopped the back wall of the last discharged scoop, in combination with the tip end of the bottom wall of the discharging passageway, and the side walls of the discharging passageway in combination with the sides of the wheel at its peripheral area, continue to produce a practically completely sealed outlet.

However, in order to preclude any grains of the material in the container which may work their way down between the top of the side walls of the wheel and the adjacent walls of the container from collecting and compacting, the side walls of the container are each formed with a small recess above the discharge outlet leading from the adjacent central side area of the wheel, so that any such particles entering between the sides of the wheel and the sides of the container would pass downwardly along these recesses and be discharged instead of collecting in between the sides of the wheel and the container walls.

Also, as a further means of preventing any possible buildup of material in between the wheel and the container walls, the thickness of the inner portion of the wheel is decreased towards its axis, which enables any particles of material to move down and away more readily. By these means the wheel is kept free and clear to rotate easily when operation of the dispenser is desired. A flexible agitator, operated by contact with the wheel periphery, is removably added when the device is employed for material which might be likely to cake above the wheel.

BRIEF DESCRIPTION OF THE DRAWINGS

In the drawings:

FIG. 1 is a perspective view of the entire device taken from the front;

FIG. 2 is a fragmentary sectional elevation of the device with most of the front wall broken away and drawn to a larger scale;

FIG. 3 is a fragmentary section taken on line 3—3 of FIG. 2, drawn to a still larger scale;

FIG. 4 is a fragmentary section taken on line 4—4 of FIG. 2, drawn to the same scale as FIG. 3; and FIG. 5 is a fragmentary section on line 5—5 of FIG. 2.

Referring first to FIGS. 1 and 2, the dispenser consists of a housing, indicated in general by the reference 10, having a front wall 11, a rear wall 12, side walls 13 and 14 and a suitable base or bottom wall 15. Preferably the lower part of the housing is provided with a removable drawer or tray 16 for removal of the dispensed material. The housing has a removable top cover 17. Preferably, the housing and all the other members of the dispenser are made of plastic, although it would be possible to use other material, entirely or in part, in place of plastic.

A dispensing wheel 18 (FIGS. 2 and 3) is secured on a horizontal shaft 19, which shaft is rotatably supported in the front and rear walls of the housing midway between the side walls. The sides of the dispensing wheel have slight clearance with the front and rear walls of the housing. The periphery of the dispensing wheel is formed into a continuous series of identical scoops 20, each scoop consisting of a back wall or peripheral lip 21, extending approximately radially inwardly from the wheel periphery, and having a curved junction with the bottom wall 22 which extends out to the periphery of the wheel and to the top of the back wall of the preceding scoop.

The dispensing wheel 18 is rotated manually by means of an external finger dial 23 (FIGS. 1 and 3) which is secured to the front end of the wheel shaft 19 on the outside of the housing, the dial 23 being provided with a finger hold 24 for each scoop 20. A finger stop 25 is mounted on the front wall of the housing to extend it over the finger dial to limit the finger rotation of the dial to the dispensing of the exact number of scoops of the material desired and to cause the discharging passageway to be completely closed after each dispensing operation, as later apparent. Suitable measuring indicia is placed on the dial wheel or adjacent wall to guide the dispensing of the desired number of scoops of the material. Such arrangement of a dial wheel is old and need not be further described. The finger dial 23 and dispensing wheel 18 are rotated only in clockwise direction in the operation of the device, viewed from the front, as indicated by the arrow.

The size and number of the scoops 20 in the dispensing wheel 18 as well as the size of the wheel itself will depend on the size of the device and the type of material for which it will most likely be used. As a general rule it has been found practical to divide the periphery of the dispensing wheel 18 into a total of 12 equal scoops, since this enables the wheel to measure out fractions of one-third or one-fourth of a stipulated total amount without adjustment. (In the drawing the wheel is shown with 8 scoops).

On the inside the housing is provided with two partitions which extend between the front and rear walls and which are located mainly at opposite sides. One of these partitions 26 (FIG. 2) has a top surface 27 which extends downwardly and inwardly from the side wall 13 towards the top of the wheel 18, and this top surface terminates close to the wheel periphery at the top of the wheel and slightly beyond the vertical center line of the wheel. As apparent, this top surface of the partition 26 causes the material in the upper part of the housing to move downward and to contact the wheel in the direction of rotation of the wheel. The fact that this sloping top surface 27 terminates at the location described enables the gravity flow of the material to seal itself off from the other side of the wheel and prevents the possibility of material passing down over the wheel in the opposite direction.

The other partition 28 in the housing has a top surface which extends downwardly and inwardly from the other side wall 14 and follows the downward path of the wheel periphery as the wheel is rotated in the normal or clockwise direction, at first spaced considerable distance from the wheel periphery but gradually approaching the wheel periphery until the partition terminates at the bottom in a cut-off edge 29 having close tolerance with the wheel periphery. Beyond this cut-off edge the device has an open discharge outlet 30 which leads down into the removable tray or drawer 16 or to any other small receptacle inserted in place thereof. A forwardly, sloping baffle 31 (see also FIGS. 3 and 4) on the rear wall of the housing at the outlet 30 aids in directing the dislodged material properly into the receiving tray or other receptacle.

Since the sides of the dispensing wheel 18 at its periphery have only slight clearance with the front and rear walls of the housing, and since the cut-off edge 29 (FIGS. 2 and 4) has close tolerance with the wheel periphery and thus with the back wall 21 of each scoop, when a scoop is moved to discharging position over the outlet 30 with its back wall 21 at the cut-off edge 29 and the rotation of the wheel is stopped, the dispensing channel formed by the partition 28, the front and rear walls of the container, and the wheel periphery, will be completely closed. Thus the material in the housing will be practically sealed off from the outside air.

In order to prevent particles of the material in the housing, which may find their way down between the sides of the wheel and the adjacent walls of the housing from collecting and compacting near the wheel center, which would generate friction and otherwise be objectionable, the front and rear walls 11 and 12 of the housing are each formed with a recess 32 (FIGS. 2 and 3), beginning a slight distance from the side of the wheel shaft in the direction of rotation of the wheel and leading from the area adjacent the central portion of the corresponding side of the wheel down to the discharge outlet 30 so as to enable any such particles to drop into the outlet instead of remaining in between the wheel and the adjacent housing wall.

As a further means for preventing any such particles of material from collecting in between the wheel and the housing walls, the wheel is so formed that each of the side faces of the wheel in the area 34 (FIGS. 2 and 3) within an annular peripheral border strip 33 is sloped inwardly toward the wheel axis, thus increasing the clearance space between the central portion of the wheel and the walls of the housing.

The preventing of the accumulation and compacting of material between the dispensing wheel and the adjacent side walls of the housing is a very important feature of the invention since accumulation of material not only interferes with the easy operation of the wheel but, if not taken care of, becomes unsanitary.

When the dispenser is used for some powdered materials, instead of for materials more granular, there may be a tendency for the powdered material to cake and form a bridge over the downward path of the wheel. To avoid this possibility an agitator 35 (FIG. 2) is removably attached at its top end to the side wall of the housing above the partition 26. This agitator has a semi-resilient arm 36 which leads through a V-shaped groove 37, which rests on the wheel periphery, to a widened, open blade 38 (FIG. 5) which extends down into close proximity with the downwardly-sloping wall of the partition 28. Rotation of the wheel causes the peripheral lips or back walls of the passing scoops to engage the wall of the groove 37 and temporarily lift the agitator. This causes agitation of the adjacent material sufficiently to prevent any tendency to cake or any tendency to cling to the housing.

We claim:
1. A metering, dial-controlled dispenser comprising a housing with front, rear and side walls, a centrally lo- cated, vertical dispensing wheel in said housing a shaft for said wheel rotatably supported in said front and rear walls, the sides of said wheel having very slight clearance with the front and rear walls of said housing respectively, a pair of partitions extending between the front and rear walls of said housing and extending downwardly and inwardly from the side walls respectively, the first of said partitions having a top surface terminating in close proximity to the top of said wheel beyond its vertical center line, the second of said partitions having a top surface gradually approaching the downward path of the wheel periphery in the normal rotation of said wheel and terminating at the bottom of said peripheral path in a cut-off edge having close tolerance with said wheel periphery, a discharge outlet leading from said cut-off edge, the periphery of said wheel formed with a continuous series of identical scoops each comprising an inwardly-extending back wall curved at the base to a bottom wall extending forwardly to the wheel periphery and the back wall of the preceding scoop, the front and rear walls of said housing each provided with an inside recess beginning a slight distance from the side of the said wheel shaft in the direction of rotation of said wheel and extending from an area beyond and below said wheel shaft down to said discharge outlet, whereby any material working its way down in between said wheel and the adjacent housing walls will escape without becoming lodged, a finger-operated dial on the outside of said housing secured to the front end of said wheel shaft to enable rotation to be imparted to said wheel, and a finger stop cooperating with said finger-operated dial.

2. The dispenser set forth in claim 1 with each of the opposite side faces of said wheel within an annular peripheral border portion sloping inwardly towards the wheel axis, whereby to provide greater clearance for any material which may work its way down between said wheel and said front and rear walls.

3. The dispenser set forth in claim 1 with the addition of a resilient agitator element for the material in said housing, said agitator element having its top end secured to the housing side wall above said first mentioned partition, passing down over and beyond said first mentioned partition and having an angular, downwardly-extending portion so arranged as to be temporarily raised by engagement with the back wall of each successive scoop as said wheel is rotated.

* * * * *